United States Patent [19]

Crossman et al.

[11] 4,350,231
[45] Sep. 21, 1982

[54] FRICTION WEAR PAD AND METHOD AND MEANS FOR FASTENING SAID PAD TO A DISK CORE MEMBER

[75] Inventors: Richard L. Crossman, Tallmadge; Richard L. Kirk, North Canton, both of Ohio

[73] Assignee: Goodyear Aerospace Corporation, Akron, Ohio

[21] Appl. No.: 187,309

[22] Filed: Sep. 15, 1980

Related U.S. Application Data

[62] Division of Ser. No. 44,879, Jun. 4, 1979, Pat. No. 4,279,333.

[51] Int. Cl.³ .................. F16D 65/12; F16D 69/04
[52] U.S. Cl. ....................... 188/218 XL; 188/73.2; 188/250 G; 192/107 R
[58] Field of Search ............. 188/73.1, 73.2, 218 XL, 188/234, 238, 240, 247, 250 B, 250 G; 192/107 R

[56] References Cited

U.S. PATENT DOCUMENTS

| | | | |
|---|---|---|---|
| 2,451,326 | 10/1948 | Eksergian et al. | 188/234 |
| 2,806,570 | 9/1957 | Markus | 188/218 XL |
| 3,064,769 | 11/1962 | Billmeyer | 188/234 |
| 3,198,294 | 8/1965 | Stacy | 188/234 |
| 3,685,623 | 8/1972 | Bradshaw | 188/218 XL |
| 3,920,108 | 11/1975 | Ely | 188/73.2 |
| 4,186,826 | 2/1980 | MacKendrick et al. | 188/218 XL |

FOREIGN PATENT DOCUMENTS

| | | | |
|---|---|---|---|
| 2253716 | 5/1973 | Fed. Rep. of Germany | 188/73.2 |
| 612433 | 11/1948 | United Kingdom | 188/234 |
| 1038311 | 8/1966 | United Kingdom | 188/218 XL |

*Primary Examiner*—Edward R. Kazenske
*Attorney, Agent, or Firm*—L. A. Germain; P. E. Milliken

[57] ABSTRACT

A friction pad configuration and a method and apparatus for fastening said pads to a disk core member wherein the base of the pad is formed with a plurality of extended tabs that are inserted in slots in the core and secured to the tabs of a pad on the opposite surface of the core by a clip that draws the base-to-base mounted pads together on the core. Alternatively, and for mounting on a single face surface of the core, U-clips are mounted on the tabs and inserted through the core to the opposite surface thereof and the ends of the U-clips are bent down into annular grooves in the face surface of the core to securely mount the pads to the core.

4 Claims, 7 Drawing Figures

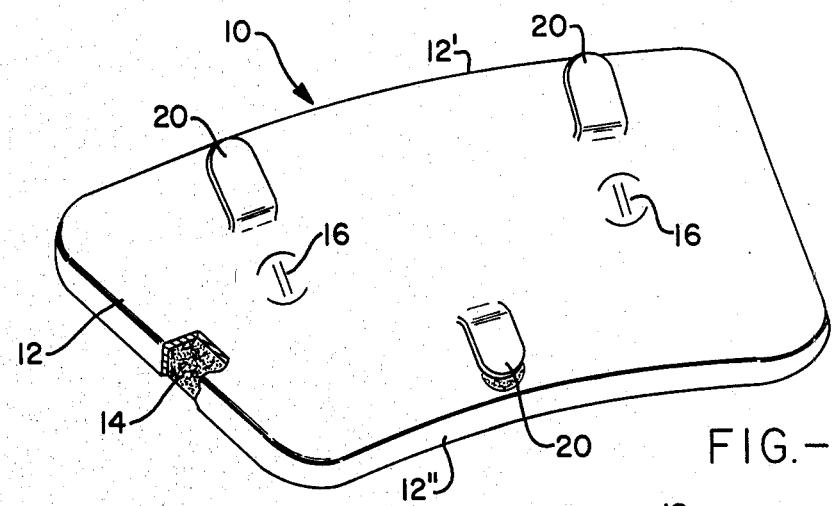
FIG.-1
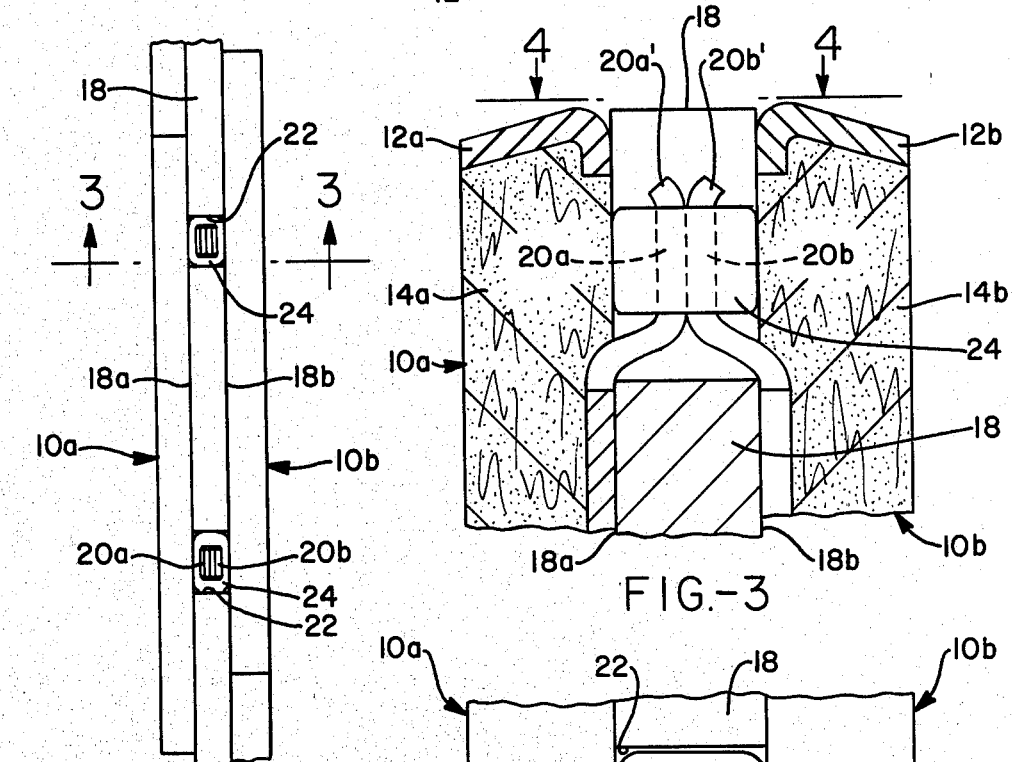
FIG.-3
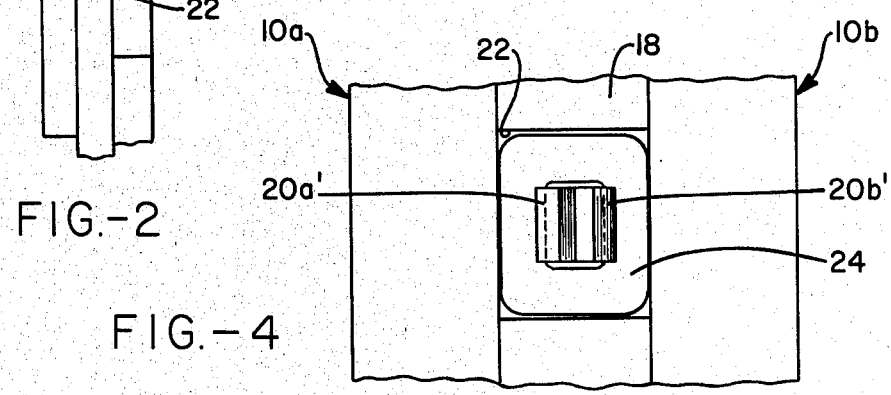
FIG.-2
FIG.-4

FRICTION WEAR PAD AND METHOD AND MEANS FOR FASTENING SAID PAD TO A DISK CORE MEMBER

This is a Division of application Ser. No. 044,879, filed June 4, 1979, now U.S. Pat. No. 4,279,333.

BACKGROUND OF THE INVENTION

This invention generally relates to disk brakes, clutches and the like, and more particularly to a friction wear pad configuration and the method and means for fastening said wear pads to one or more faces of a disk core member. The pads are generally in the form of cups having friction material embedded therein which may be any of the well known metallic friction lining materials including sintered friction materials.

Heretorfore, attachment of friction wear pads to a core member involved various type fasteners including snap-type fasteners, rivets, force-fit fasteners and the like. Other type fastening techniques included spot welding and resistance and/or projection welding techniques. Descriptions and details of these prior art devices and techniques may be had in the following U.S. Pat. Nos.: 4,076,106; 3,724,614; 3,710,914; 3,913,716; and 3,982,612. While for some applications the devices and/or techniques of the prior art will work satisfactorily, they are not sufficient or adequate for easy replacement of the pads on the core member when such replacement involves a field-type or retro-fit operation. In this respect, therefore, the instant invention provides a pad configuration and a fastening method and means that obviates the requirement for sophisticated apparatus and/or welding equipment for field removal and attachment of the friction pads.

The invention, therefore, provides a friction component for brakes, clutches and the like wherein friction pads having continuous friction face surfaces and flat base surfaces are affixed to a disk core member, which pads provide an increased friction wear surface and an increased wear depth of friction material.

Further, the invention provides a method and means for attaching friction wear pads to a disk core member in a force-fit manner using simple and available tools for a field retro-fit operation.

SUMMARY OF THE INVENTION

Various objects and advantages of the invention are met and accomplished in a friction pad configuration and a method and means for fastening the pads to either one or both face surfaces of a disk core member wherein the base of the friction pad is formed with a plurality of extended tabs or tangs that are inserted in slots in the core and secured to the tabs of a friction pad on the opposite surface thereof such as to draw and hold the pads to the core. In an alternative embodiment wherein pads are attached to but a single face surface of the core member, U-clips are attached to the pad tabs and inserted through the core and spread on the opposite side thereof such as to secure the pads to the core.

BRIEF DESCRIPTION OF THE DRAWINGS

The various objects and advantages of the invention will become evident from the description that follows when considered in conjunction with the accompanying drawings in the several figures in which like parts bear like reference numerals.

FIG. 1 is a bottom perspective view of a friction pad showing the tab configuration for mounting of the pad to a disk core member;

FIG. 2 is an elevational view of a core member having friction pads mounted on opposing faces thereof in accordance with this invention;

FIG. 3 is a greatly enlarged sectional view as taken on line 3—3 of FIG. 2;

FIG. 4 is an end elevational view as taken in the direction of line 4—4 of FIG. 3;

BRIEF DESCRIPTION OF THE INVENTION

Figure 5:
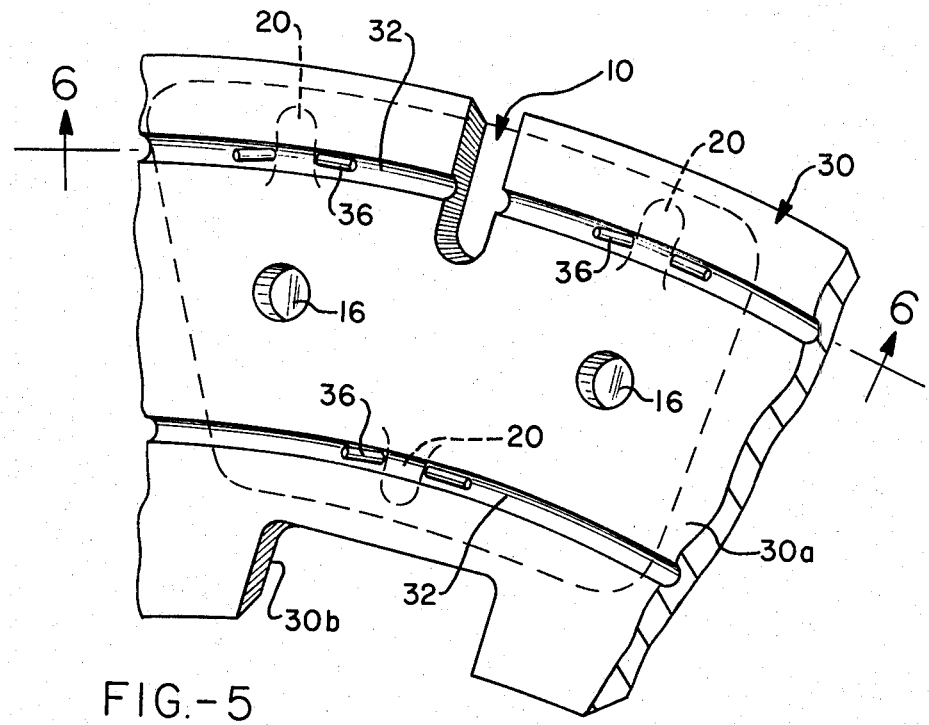
FIG. 5 is a plan view of a core member having friction wear pads mounted on but one face surface thereof, the view being taken from the back side of the core with the pads being mounted on the opposite side.

Referring to FIG. 1, a friction wear pad of the type generally mounted on a rotor or stator disk core member is indicated by reference numeral 10 and comprises a metal cup-like element 12 having sintered friction material 14 contained therein. Various combinations of materials may be used for the pad cup and friction material structure and these are all within the knowledge of those persons familiar with and skilled in the art. Such materials are outside the scope of this invention and therefore will not be specifically described. To continue, the view of FIG. 1 is toward the base portion of the pad 10 which is normally in contact with a disk core member face surface to which it is mounted, and thus the base is a substantially flat surface. It is generally well known in the art to provide anti-rotational nibs on the base surface and these are indicated by reference numeral 16. The nibs 16 are normally formed from the base material 12 and are intended to engage recesses or apertures in the disk core member. In the process of frictional engagement of the pad friction surface, the nibs 16 prevent the pad from rotating on the core member.

Now therefore, and in accordance with this invention, the wear pads 10 are provided with mounting tabs or tangs 20 which are also formed from the pad base material 12 when the pad is made. The tabs 20 extend from the base and at least one such tab 20 is provided facing the outer periphery 12' of the pad and at least one such tab is provided facing the inner periphery 12" of the pad. Of course the number and location of the tabs will vary depending upon the arc lengths of the outer and inner peripheral edges as these will vary between different size disk core members. In some instances a single tab 20 may suffice facing the outer edge 12' while more than a single tab may be required facing the inner edge 12". The invention therefore is not considered limited by the number or orientation of the tabs 20.

Figure 7:
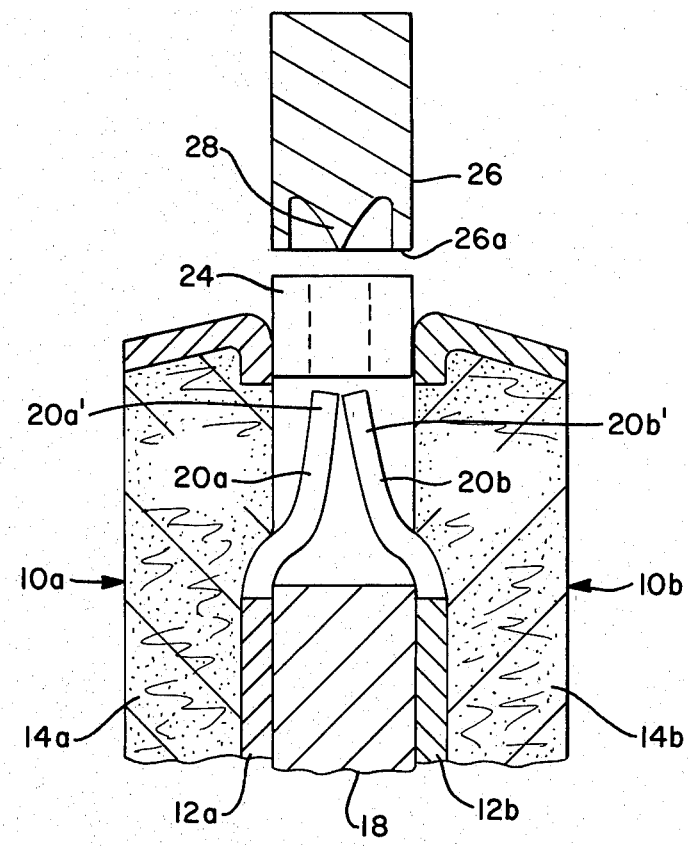
FIG. 7 is a sectional view similar to that of FIG. 3 illustrating the mounting procedure of the friction pads to the core member.

Referring to FIGS. 2, 3, and 4, a disk core member 18 is shown having friction wear pads 10a mounted on one face surface 18a and pads 10b mounted on the opposite face surface 18b thereof. The core member 18 is provided with slots or recesses 22 in spaced relationship about the inner and outer peripheries of the core such as to receive the tabs 20a and 20b of the pads 10a and 10b respectively. Securing of the pads to the core member is accomplished by a tubular clip 24 that is driven down over the tab ends 20a and 20b. As illustrated in FIG. 7, the tabs 20 may be formed from the pad base 12 in an initially angular orientation from the base. Thus, when the clip 24 is driven over the tabs 20a and 20b, it tends to force the tabs together with the result being that the pads 10a and 10b are drawn securely to the core 18. When the clip 24 is in position, the ends of the tabs protrude therefrom and these are then spread to keep the clip from moving off of the tabs. In this respect therefore, it is anticipated that a simple tool 26 may be made having a driving surface 26a for engagement with the clip 24 while also having a centrally oriented wedge 28 formed as part of the tool so as to simultaneously spread the tab ends 20a' and 20b' when the clip 24 is driven into position. The result is a locked-on clip 24 as shown in FIG. 3.

Figure 6:
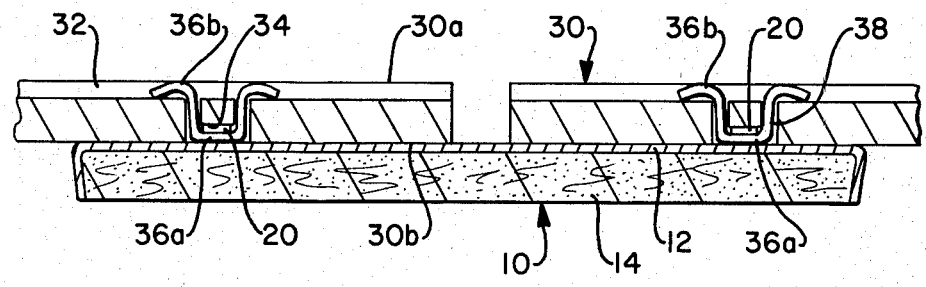
FIG. 6 is an elevational view as taken on lines 6—6 of FIG. 5.

Referring now to FIGS. 5 and 6, an alternate embodiment of the invention is shown wherein friction wear pads 10 are mounted to but one face surface of the disk core member. In this embodiment, the core member 30 is provided with annular grooves 32 on one face surface 30a and the pads 10 being mounted on the opposite face surface 30b thereof. The tabs 20 on the base of pad 10 may be seated in mating recesses 34 on the face surface 30b and are secured therein by brads or U-clips 36. The clips 36 are generally of a U-shaped configuration with the bottom of the U-shape 36a formed to accept a tab 20 while the arms 36b are driven through holes 38 provided in the core member in alignment with the grooves 32 on the opposite face thereof. Thus, upon exiting the surface 30a, the clip arms 36b are spread in the manner of a staple to secure them to the core.

The advantages of the invention should now be apparent. First, the friction wear pads 10 may all be identical for either double-sided or single-sided core mounting. Second, the wear surface of the pad is continuous across the full friction face area having no holes therein for insertion of rivets and the like. Third, the useful depth of friction material 14 extends through the thickness of the pad. Fourth, the pads are easily removed from the core member and replaced with new pads without affecting the core structure in any way. Fifth, the core design is simplified and may be made by less expensive manufacturing processes. Finally, simple tools may be used to mount or demount the pads and this is advantageous in a field-type or retrofit operation.

While the specific embodiments and details thereof are shown for the purpose of illustrating the invention, it will become apparent to those skilled in the art that various changes and modifications may be made therein without departing from the spirit and scope of the invention.

We claim:

1. A friction component comprising: a substantially circular disk core member having an inner arcuate peripheral edge and an outer arcuate peripheral edge and at least two annular grooves formed in one face surface of the disk core member, a plurality of apertures through the disk core member in alignment with and about the annular grooves, one of said grooves in spaced position from the inner peripheral edge while the other of said grooves is in spaced position from the outer peripheral edge of the disk core member;

a plurality of friction pads mounted on the other face surface of the disk core member opposite said one face surface having the annular grooves, each said pad having a substantially flat base and each said base having a plurality of tabs formed from the base and extending therefrom, said tabs being bent such that a major portion of the length thereof is substantially parallel to the plane of the base and facing toward said other face surface of said disk core member; and clip means mounted between each of the tabs and the base and penetrating the apertures in the disk core member to said one face surface thereof to an extent such that a portion of their length may be turned down within the grooves and thus securely fasten the friction pads to the disk core member.

2. The friction component as set forth in claim 1 wherein recesses are provided in said other face surface of the disk core member having the pads mounted thereon to provide seats for said tabs, said recesses having a depth such that the pad base is in intimate contact with said other face surface of the disk core member.

3. The friction component as set forth in claim 1 wherein the clip means are U-shaped clips, a bridge of the U-shaped clips engage a respective one of said tabs while the legs of the U-shaped clips penetrate the apertures in the disk core member to said one face surface thereof.

4. A method of mounting friction wear pads to but one face surface of a substantially circular disk core member having inner and outer peripheral edges comprising the steps of:

providing at least two annular grooves within one face surface of the disk core member and a plurality of apertures extending through the disk core member in alignment with and about the annular grooves, one of said grooves being in spaced position from the inner peripheral edge while the other of said grooves being in spaced position from the outer peripheral edge;

providing each of said friction wear pads with a base and having a plurality of tabs extending therefrom, at least one tab formed for alignment with one of said apertures in alignment with said one groove and extending toward said outer peripheral edge and at least one tab formed for alignment with one of said apertures in alignment with said other groove and extending toward said inner peripheral edge;

fastening the pads to the other face surface of the disk core member opposite said one surface by attaching U-shaped clips between the tabs and base and driving the clips through the apertures extending through the disk core member; and bending the ends of said U-shaped clips that extend through to said one face surface of the disk core member down into the annular grooves provided in said one face surface of the disk core member.

* * * * *